United States Patent Office 2,747,965
Patented May 29, 1956

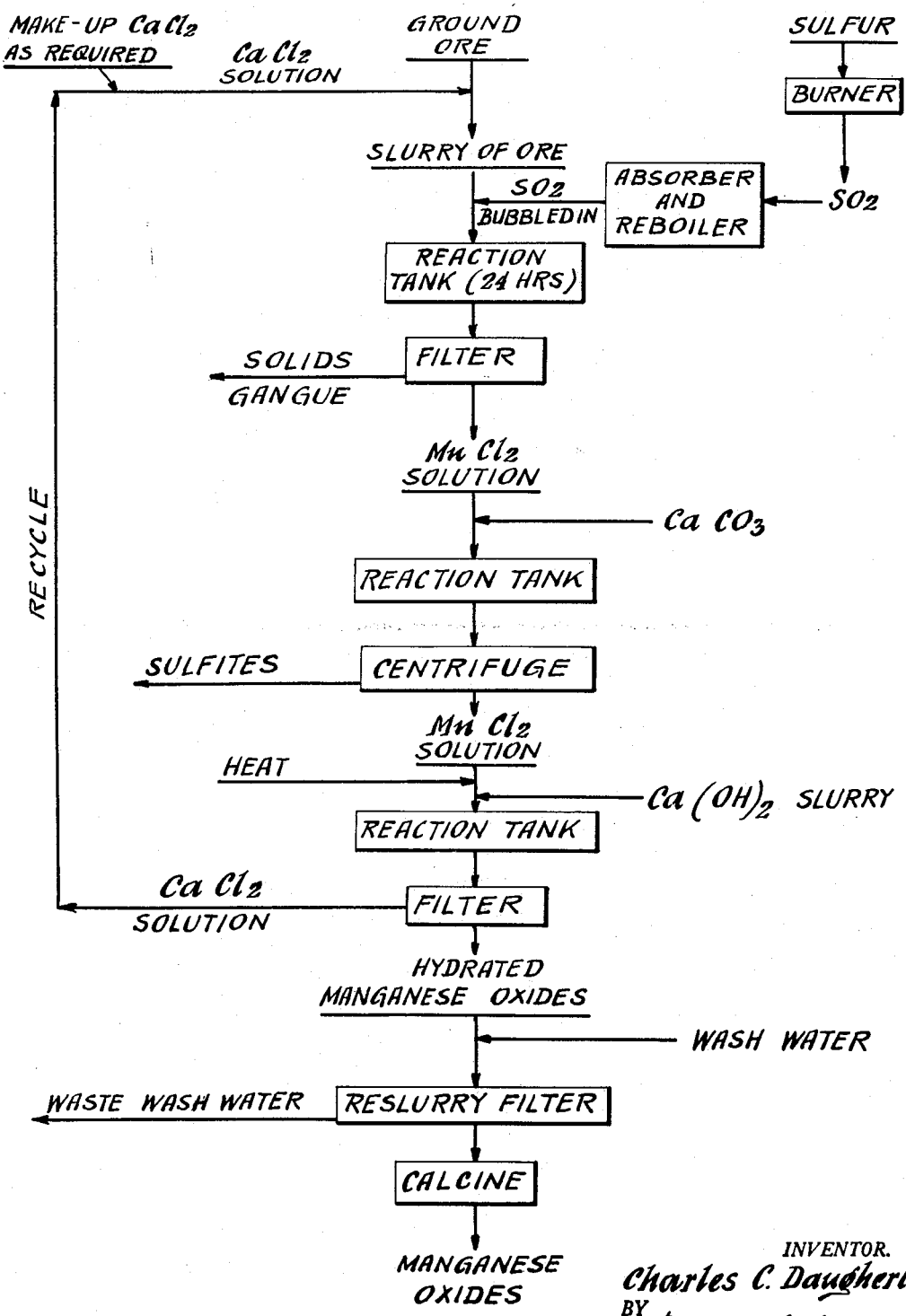

2,747,965

RECOVERY OF MANGANESE FROM ORES

Charles C. Daugherty, New Bern, N. C., assignor to Republic Steel Corporation, Cleveland, Ohio, a corporation of New Jersey Application January 9, 1953, Serial No. 330,511

6 Claims. (Cl. 23—145)

This invention relates to procedure for extracting manganese values from ores containing such element chiefly in its manganous, i. e., divalent state, and especially to the extraction of manganese values from low grade ores, which may not contain more than 15% or 20% manganese and which often assay 10 to 12% manganese or less. More specifically, the invention is directed to procedure for separating or concentrating manganese from ores which are of the character described above and which contain other metallic values, specifically iron in considerable amount.

Although the methods described below are applicable to ores of the stated character from other regions, they have been developed and are found particularly successful for the treatment of manganiferous minerals found in Maine, especially in the deposits in Aroostook County. These Maine ores have a high phosphorus as well as large iron content, and because of the phosphorus, pyrometallurgical treatments appear unduly expensive. At the same time, the chemical combination of the manganese in Maine ores, apparently to a large extent as manganous carbonate and partially as silicate, or perhaps in the form of double or complex combinations of iron and manganese, is such that no effective results will be obtained with physical concentration or beneficiation methods. Indeed some belief, which I have found to be erroneous, that the manganese in these ores was present in a silicate form highly refractory to any type of concentration treatment, has apparently heretofore discouraged attempts to utilize these minerals as a source of manganese.

By way of example, a number of lots of Maine ore of the specific type mentioned above were found to contain about 12% manganese, approximately 21% iron and slightly less than 1% phosphorus (it being understood that a particular difficulty in the refining of these ores is in obtaining efficient and economical recovery of manganese, free of iron). Because of the low grade of the ore in manganese, the cost of any concentration treatment is a primary factor, and the present invention is particularly designed to afford a recovery method which from the standpoint of reagents or other materials, power, equipment and manipulation, involves much less cost than prior procedures that might seem to have been available.

Although wet treatment of manganese-containing minerals with a mixture of alkali metal or alkaline-earth chloride and sulfurous acid has been proposed for separation of manganese dioxide (i. e., tetravalent manganese) from gold ores and the like, and also, with the aid of oxidizing agents, for concentration of manganese from other manganiferous ores, all of such procedures have appeared to involve either the separate oxidation of the sulfite radical to yield sulfate (e. g., for precipitation of calcium sulfate where calcium chloride is the chloride employed in the treatment) or have utilized the tetravalent or higher oxidized state of the manganese itself for like effect. Thus in one previously described method for extracting manganese values, an oxidizing agent is specifically required, e. g. in treating manganese carbonate ore, so that although manganese chloride ($MnCl_2$) is recovered in solution, calcium sulfate is precipitated and separated with the gangue. In the last-mentioned procedure, it is indicated that other metallic substances, especially iron, are dissolved along with the manganese, and certain special operations are thereafter necessary in order to separate iron, aluminum, and other compounds from the solution, prior to ultimate recovery of manganese itself. Where the manganese of the mineral is present in a higher state of oxidation than in manganese carbonate, for example as in the case of manganese dioxide, it has been indicated that an additional oxidizing agent is unnecessary and the same results are reached, presumably by reason of the corresponding, oxidizing effect of the high-valence manganese compound.

The present invention is based on the discovery that in the case of iron-containing manganese ores, specifically minerals bearing manganese which is chiefly or essentially in manganous form (as explained hereinabove), an unexpected preferential or selective recovery of manganese, i. e., essentially completely free from iron, may be achieved by treating, e. g., leaching the ore with calcium chloride solution saturated with sulfur dioxide, while preventing oxidation of the reacting mixture, i. e., while preventing access of oxidizing agents, to an appreciable extent, during the leaching operation. By such procedure, it has now been found that a solution of manganese chloride ($MnCl_2$) is obtained which is free of iron in chloride or other dissolved form, or at least free of all but very small quantities of iron and other metals. At the same time an effectively high recovery of manganese is obtained by the complete process, including subsequent precipitation of manganese in oxide or hydrated oxide state, present experience being that 80% or more of the original manganese values may be recovered in this manner.

While the precise chemical reactions involved in the leaching operation, i. e. utilizing calcium chloride solution which contains and which is preferably saturated with sulfur dioxide, are obscure and while the invention thus cannot be limited to a precise theory of chemical sequence, the fact that the calcium is precipitated as sulfite rather than sulfate demonstrates that the reactions are different from those involved in the prior processes described above, and it is believed that the unusual results, namely in preventing solution of iron in the resulting leach liquor (i. e. in preventing formation of soluble iron chloride or other compound), is directly related to the specific method, especially in avoiding oxidation or presence of oxidizing agents, whether separately added or represented by the major body of manganese itself. It seems clear that there is at most little conversion of sulfite to sulfate.

According to my present understanding as derived from the above discovery, the presence of considerable oxidizing effect in prior procedures may have converted sulfurous acid to sulfuric acid or at least produced sulfate ions, yielding intermediate availability of hydrochloric acid which in turn dissolves iron from its oxide or carbonate. It is likely that in the present process the manganese is dissolved as sulfite, perhaps at least to the extent that there is an excess of $SO_2$ or sulfurous acid with respect to the proportion of manganese that actually reacts, and the manganese sulfite thereafter reacts with calcium chloride to yield soluble manganese chloride and insoluble calcium sulfite. In any event, the major, added calcium content of the insoluble material remaining after separation of the leach liquor by filtration, is in sulfite form, while at the same time the liquor itself is remarkably free of iron. In consequence, an unusually economical operation is afforded, whereby in a single step manganese values are not only concentrated from low grade ore, but are separated from iron values, it being ordinarily very difficult, and indeed heretofore deemed impossible in procedures of this type, to effect, in acid leaching, a selective separation between manganese and iron, which are so closely alike in chemical characteristics.

According to present experience it seems important or at least preferable to have the ore mixed with or suspended in the calcium chloride solution before the sulfur dioxide is introduced. If the calcium chloride solution is treated with the gas before ore is present, it appears that the selective action, in dissolving manganese but not iron, may be more or less impaired; a possible explanation is that in such case there is or may be time for reaction between $CaCl_2$ and $SO_2$ to form HCl and $CaSO_3$ and then when the ore is treated the HCl tends to attack and dissolve both manganese and iron simultaneously.

In practical operation, the ore is ground to a suitable fineness, if desired after such cleaning operation as may be feasible, and then treated with calcium chloride solution, of considerable concentration, which is preferably saturated with sulfur dioxide, understood to be present in solution as sulfurous acid, the sulfur dioxide being added after the ore is present and being advantageously utilized in theoretical equivalence to the manganese assay of the ore, i. e. sufficient to provide full conversion of the manganese to manganous sulfite. After leaching for a suitable period of time, the liquid is filtered from the solids, which are found to contain the gangue, most of the added calcium as insoluble calcium sulfite, and the iron values which may have amounted to 20% or more of the original mineral. The leached liquor consists chiefly of a solution of manganous chloride, and for recovery of the manganese in convenient oxide form, the liquid may be treated with lime to precipitate the manganese values and leave calcium chloride solution which can be recycled to the leaching step.

If desired, the leached liquor, prior to the precipitation with lime, may be treated with a small amount of calcium carbonate, which neutralizes the excess sulfur dioxide and which thereby completes the precipitation of some calcium sulfite which may have remained dissolved because of the excess $SO_2$. In practice, the further precipitate thus resulting from addition of a little calcium carbonate may also contain some sulfate, e. g., calcium sulfate, occasioned by oxidation due to a minor content of tetravalent manganese in the ore, or due to slight oxidation which may not be easily prevented in the leaching. The precipitate from the calcium carbonate treatment, if such is utilized, may be readily removed, as by filtration, or very rapidly by a simple centrifuging step.

The liquid thus produced is essentially a water solution of manganous chloride, perhaps with some small manganic value, and from this solution, if desired, the manganese may be precipitated in any suitable manner. I have discovered that an especially efficient and economical precipitation is achieved by adding milk of lime, e. g., a slurry containing considerable quantities of undissolved (as well as dissolved) calcium hydroxide. As a result, after maintenance of the mixed leach liquor and lime slurry in a reaction tank for a suitable length of time, e. g., with agitation if desired and preferably although not always necessarily, with the aid of heat, the manganese values are very largely precipitated in oxide form, the precipitate being describable as manganese hydroxide but being at present believed to be a hydrated oxide of manganese (chiefly in manganous state) rather than a manganese hydroxide. Having the solution heated during precipitation appears unusually beneficial, especially to facilitate the subsequent filtering; a convenient practice is to heat the manganous chloride solution to boiling and then add the lime slurry.

Upon filtration, the liquid is separated, now carrying most of the calcium as dissolved calcium chloride, and the same, with some small addition of make-up calcium chloride as necessary, can be utilized for further leaching treatment of the original ore. While a slight content of manganese may remain in solution, the recycling of the liquid prevents actual loss of manganese from the circuit, since the percent manganese which thus fails to be precipitated will never rise above a certain, small equilibrium value. The precipitated manganese material, after filtration and washing with water, can then be calcined to yield manganese in oxide form, of a relatively high purity, especially with respect to iron, phosphorus and other elements in the original ore. The calcined oxide appears to be largely manganous oxide, perhaps with some manganese dioxide or some manganosic oxide ($Mn_3O_4$); as now understood, the chief recovery is (except perhaps as the state of oxidation may be raised during the calcining process) of a manganese oxide in a state of oxidation lower than the tetravalent form.

It will be understood that various modifications may be employed, although as explained, it seems greatly preferable in the leaching operation to mix the ore first with calcium chloride solution to form a slurry in the reaction or leaching tank and then to bubble sulfur dioxide into the slurry, i. e., rather than to treat the calcium chloride solution first with sulfur dioxide. Where the sulfur dioxide is produced by a sulfur burner or by burning other sources of sulfur such as pyrite, it may be desirable to absorb the gas first in plain water, thereby permitting other gases, including air, which might have oxidizing effect, to be passed off. Then the water can be boiled to drive off the sulfur dioxide, for treatment of the calcium chloride solution in the slurry. Alternatively, as first indicated above, the sulfur dioxide from the sulfur burner or other source may be directly bubbled through the calcium chloride solution (in which the ore is disposed) to saturate the solution, e. g. if there is no serious problem of oxidizing gases carried with the sulfur dioxide. In some cases, other agents such as magnesia, may be used to precipitate manganese values from the manganese chloride solution.

The drawing is a flowsheet illustrating the invention as applied to a practical process for extracting manganese values from ore.

Although it may sometimes be desirable to carry out one or more of the operations in a continuous or semi-continuous manner, the illustrated instance of the procedure is advantageously a batch process. By way of example, 10.4 tons of ground ore having a 12% manganese content may be used to form a single batch. With this quantity of ore is mixed a calcium chloride solution containing 6.8 tons of calcium chloride and 10,000 gallons of water. The resulting slurry of ore and calcium chloride solution is placed in a reaction tank and 1.45 tons of sulfur dioxide are bubbled into it.

The sulfur dioxide should be substantially free of oxygen. In the process illustrated, oxygen-free sulfur dioxide is obtained by burning sulfur or a sulfur-containing compound in a suitable burner and passing the products of combustion through a body of water, so that the sulfur dioxide is absorbed in the water, while the oxygen passes through the water and is not absorbed. This water solution of sulfur dioxide is then boiled to remove the sulfur dioxide from the water, and the sulfur dioxide is then bubbled into the reaction tank containing the slurry of calcium chloride solution and ore. The absorbing of the sulfur dioxide in the water and the separation of it from the water takes place in an apparatus identified in the drawing as an absorber and reboiler.

After the sulfur dioxide is bubbled into the reaction tank, the slurry is allowed to stand there for approximately twenty-four hours. During this time, the slurry may be agitated continuously or periodically as desired. No heat is applied to the reaction tank, and the tank is preferably closed to keep air out as far as conveniently possible. It is desired to keep air and other oxidizing agents away from the slurry during this leaching process in order to prevent oxidization of the sulfite radicals in the solution to sulfate radicals. If any appreciable amount of oxidization occurs, iron in the ore will be brought into solution along with the manganese. The slurry is preferably kept cold during the leaching process, or at least at ambient temperatures, since an increase in temperature would promote any tendency to oxidize.

After the leaching process is complete, the slurry in the reaction tank is filtered. The solids from the filter comprise the gangue plus precipitated calcium sulfite which contains most of the calcium added in the calcium chloride solution. The gangue contains the iron values which were in the original ore. The solution from the filter contains principally manganese chloride ($MnCl_2$) as the dissolved material, with some sulfite because of the excess of sulfur dioxide in the reaction tank. A typical batch of the process produces 10,680 gallons of solution and 9.4 tons of gangue which retains 510 gallons of water.

The solution from the filter is treated with a small quantity of calcium carbonate. In the present example 63 lbs. were used. The purpose of this calcium carbonate treatment is to precipitate the remaining sulfites from the solution, together with any sulfates which may exist there. This precipitate is removed either by a filter or a centrifuge. In the process illustrated in the flowsheet a centrifuge is used. Such an arrangement is practical because of the small quantity of precipitate. Substantially the entire amount of solution, namely 10,680 gallons, continues through the process. This solution is passed to a second reaction tank, where it is heated to boiling and while hot, treated with a slurry of fresh lime. In the present example, 1.16 tons of lime (as hydrated lime) is used with 480 gallons of water. When the milk of lime is mixed with the solution, the manganese precipitates out as hydroxide or hydrated manganese oxides, believed to be principally MnO, leaving a solution of calcium chloride. The solution is filtered and the filtrate is recycled to the beginning of the process. The precipitate is washed in a reslurry filter to remove any remaining calcium chloride, and the remaining precipitate is then calcined to produce concentrated manganese oxides, understood to be chiefly MnO, perhaps with some $Mn_3O_4$ and some $MnO_2$.

In the present example, 11,250 gallons of slurry are obtained from the second reaction tank, and this is filtered to obtain a solution of 10,480 gallons of water containing 6.68 tons of calcium chloride. After the calcining process, in which 1.13 tons of water are removed, there remain manganese oxides containing approximately one ton of manganese.

Using procedure such as set forth in the above example with ore from Aroostook County, Maine, having an analysis of 11.96% manganese, 20.84% iron and 0.93% phosphorus, the manganese recovery (obtained in the calcined oxide) is at least 80% or more. The grade of the product is very good in that there is little or no iron, no serious contamination with lime, and no objectionable phosphorus contamination, the phosphorus content being usually about 0.01%. The dried precipitate from the last filtration usually contains 48% or more of manganese, which rises to 57 to 60% in the calcined clinker.

While I have described a specific example of a process embodying my invention, many modifications thereof will readily occur to those skilled in the art and I therefore intend my invention to be limited only by the appended claims.

I claim:
1. In a method of extracting manganese values from ore containing iron and manganese principally in its divalent state, the step of leaching the ore in the absence of external oxidizing agents by bringing the ore into contact with calcium chloride solution and then saturating said ore-containing solution with sulfur dioxide to bring manganese values into solution as manganese chloride, while leaving the iron values undissolved.

2. A method of extracting manganese values from ore as defined in claim 1, in which said leaching step is continued for a period sufficient to dissolve at least about 80% of the manganese in the ore.

3. A method of extracting manganese values from ore as defined in claim 1, in which the temperature of the leaching process is maintained substantially equal to ambient temperature.

4. A method of extracting manganese values from ore as defined in claim 1, in which the manganese-containing solution is separated from solid materials and in which said solution is thereafter treated with calcium carbonate to remove from solution excess sulfur dioxide and residual calcium sulfite produced by reaction of calcium chloride and sulfur dioxide.

5. Method of extracting manganese values from ore containing iron and manganese principally in its divalent state, comprising burning a sulfur-containing substance, bubbling the products of combustion through water to absorb the sulfur dioxide therein while allowing oxygen to pass through, heating the water solution to produce substantially oxygen-free sulfur dioxide, preparing a water solution of calcium chloride, mixing the ore with said calcium chloride solution to form a slurry, bubbling the oxygen-free sulfur dioxide into the slurry until the latter is saturated with sulfur dioxide, and allowing the saturated slurry to stand to bring divalent manganese values in the ore into solution as manganese chloride, while leaving the iron undissolved, separating the solids from the solution, heating the solution to boiling, treating the hot solution with a lime slurry to precipitate the manganese in hydrated oxide form, and separating the precipitate from the liquid.

6. In a method of preparing an iron-free water solution of manganese chloride from an ore containing iron and manganese principally in its divalent form, the steps of burning a sulfur-containing substance, bubbling the products of combustion through water to absorb the sulfur dioxide therein while allowing oxygen to pass through, heating the water solution to produce substantially oxygen-free sulfur dioxide, preparing a water solution of calcium chloride, mixing the ore with said calcium chloride solution to form a slurry, bubbling the oxygen-free sulfur dioxide into the slurry until the latter is saturated with sulfur dioxide, and allowing the saturated slurry to stand, to bring divalent manganese values in the ore into solution as manganese chloride, while leaving the iron undissolved.

References Cited in the file of this patent
UNITED STATES PATENTS

| | | |
|---|---|---|
| 29,474 | Dunlop | Aug. 7, 1860 |
| 1,348,068 | Van Arsdale et al. | July 27, 1920 |
| 1,835,474 | De Witt | Dec. 8, 1931 |
| 1,962,160 | Sweet et al. | June 12, 1934 |
| 2,070,496 | Sweet et al. | Feb. 9, 1937 |
| 2,462,499 | Hoak | Feb. 22, 1949 |